United States Patent
Daniels, Jr. et al.

(10) Patent No.: US 6,791,050 B2
(45) Date of Patent: Sep. 14, 2004

(54) METHOD AND APPARATUS FOR PROCESSING AND REDUCING THE AMOUNT OF RETURN TO SENDER MAILPIECES

(75) Inventors: Edward P. Daniels, Jr., Trumbull, CT (US); Robert K. Gottlieb, Milford, CT (US); Joseph D. Mallozzi, Trumbull, CT (US)

(73) Assignee: Pitney Bowes Inc, Stamford, CT (US)

( * ) Notice: Subject to any disclaimer, the term of this patent is extended or adjusted under 35 U.S.C. 154(b) by 122 days.

(21) Appl. No.: 10/008,903

(22) Filed: Dec. 7, 2001

(65) Prior Publication Data

US 2003/0109954 A1 Jun. 12, 2003

(51) Int. Cl.[7] ................................................. B07C 5/00
(52) U.S. Cl. ...................... 209/584; 209/900; 209/939
(58) Field of Search ........................... 209/584, 900, 209/737; 700/220, 226, 227; 382/306

(56) References Cited

U.S. PATENT DOCUMENTS

| | | | | |
|---|---|---|---|---|
| 4,632,252 A | * | 12/1986 | Haruki et al. | 209/546 |
| 4,992,649 A | * | 2/1991 | Mampe et al. | 209/546 |
| 5,031,223 A | * | 7/1991 | Rosenbaum et al. | 382/101 |
| 5,317,654 A | * | 5/1994 | Perry et al. | 382/101 |
| 5,697,504 A | * | 12/1997 | Hiramatsu et al. | 209/546 |
| 5,703,783 A | * | 12/1997 | Allen et al. | 700/213 |
| 5,794,789 A | * | 8/1998 | Payson et al. | 209/549 |
| 6,119,051 A | * | 9/2000 | Anderson et al. | 700/221 |
| 6,156,988 A | * | 12/2000 | Baker | 209/584 |

* cited by examiner

*Primary Examiner*—Donald P. Walsh
*Assistant Examiner*—Joseph Rodriguez
(74) *Attorney, Agent, or Firm*—Christopher J. Capelli; Angelo N. Chaclas

(57) ABSTRACT

An embodiment of the present invention comprises a mailpiece sorting apparatus video coding station, inserter system, return mail workstation and a web server for interconnecting several components of the system. The system provides a closed loop solution for reducing return to sender mailpieces generated by a company that is sorting incoming mailpieces using an automated system. This invention overcomes the disadvantages of the prior art providing updated data to inserting systems producing such mailpieces. This helps to solve data quality problems at their source and reduce processing costs by reducing the number of return to sender mailpieces.

4 Claims, 10 Drawing Sheets

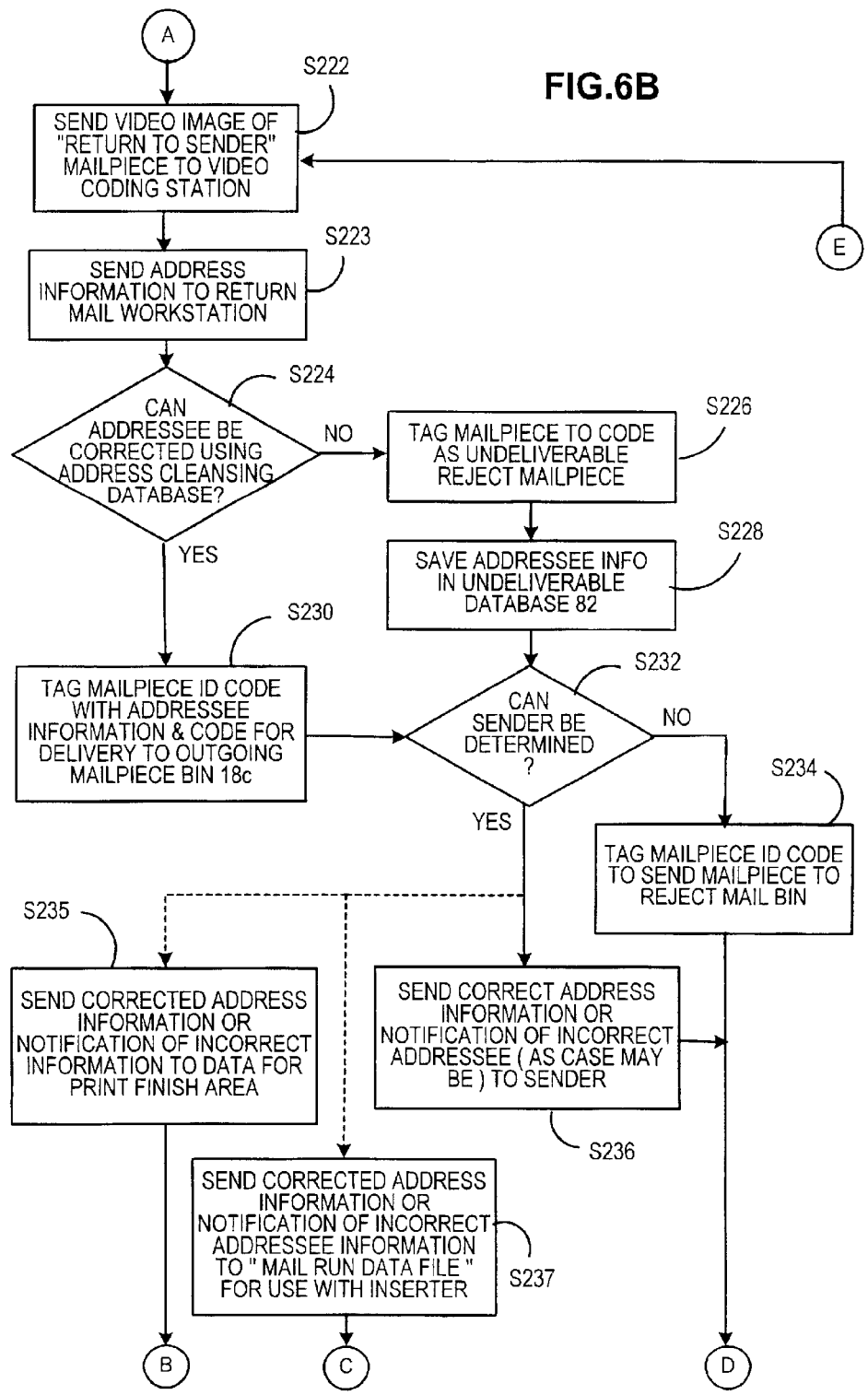

METHOD AND APPARATUS FOR PROCESSING AND REDUCING THE AMOUNT OF RETURN TO SENDER MAILPIECES

FIELD OF THE INVENTION

The invention disclosed herein relates generally to automated mail sorting and more particularly, method and apparatus for processing return to sender mail and reducing the amount of subsequent return to sender mail created by the sender.

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee (i.e. employee or department) in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business.

Various automated mail-handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition (OCR) system and compare the read information to an addressee database in order to determine the appropriate destination points for delivery of the mailpieces. Some of the incoming mail received at a mailroom of the company can be unreadable by the OCR system, the quantity of which can be great since recipients cannot control the addressee format in which the incoming mail is received. Some of the unreadable mail could be, for example, mail which is not OCR readable called OCR rejects (i.e. smeared or needs to be opened to determine addressee), mystery mail which are mail with no particular addressee (i.e. mail addressed to a company or department only or mail with poor quality handwriting), or research mail (i.e. mail that cannot be read by OCR but does not require opening for the operator to determine the addressee, including the situation where there are several potential addressees with the same name). The unreadable mail, which will be referred to generally as reject mail is expensive to process since it drains the resources of the mail room requiring additional time and labor for sorting and delivery.

Another type of mail, which can be categorized as unreadable, generally by incoming mail sorting apparatus is return to sender (RTS) since the addressee, in most cases, is not in the addressee database of the mail sorting apparatus. Typical return to sender mail is marked with return to sender text and/or a graphics symbol. The graphics symbols applied to return to sender mail are not uniform or standard and are not applied to a standard location on return to sender mailpieces. An OCR system configured to recognize text could be configured with additional capabilities and additional read regions to recognize return to sender icon or markings. Other methods could also be used to determine return to sender mail such as reading the addressee ZIP Code, if it is readable to determine if the addressee is in the addressee database.

An easier and possibly less costly method of handling the challenges of return to sender mail is to reduce it at its source—the company where the mailing is produced. The reduction of return to sender mail by obtaining more accurate address information at it's source is important for many reasons including reducing overhead costs in sorting and delivering mailpieces, but also in managing customer relationships. Each year, corporations spend billions of dollars on customer relationship management (CRM). One of the biggest challenges businesses face is preventing inaccurate data from compromising their databases. As Web based interactions become more prevalent, customers become more remote and interactions with customers become impersonal. Customer relationship management becomes more important. As businesses capitalize on making sales to existing customers, it becomes increasingly important to have up to date customer information including address information in the business database, which is an important asset. Accurate data is the cornerstone of any customer relationship management strategy. A corporation cannot build a relationship or properly serve or sell to customers if it does not know where they are. Companies routinely face the challenge of keeping data accurate in a world that is constantly changing.

Any CRM strategy that fails to recognize the dynamic nature of consumers' lives and lifestyles is likely to fall short of expectations. The dynamic lives and lifestyles of American's are evident in the fact that the average American moves about once every five years. In fact, 17 percent of Americans move every year. Of the people who move annually, 40 percent of them do not notify the USPS of their new address. Furthermore, even when they do not move, consumers are not stagnant; they get married, buy homes, get promotions, switch jobs, etc. They essentially become lost customers to many companies. For high-volume mailers, the consequences include missed cash flow and costly mail rework.

To compete in our data centric world, businesses need to ensure data integrity and accuracy. But how do you get accurate customer data? Companies need to append missing information or correct inaccurate information to complete the portrait of their customer and feed that data to the various operational units that need it—including call centers, marketing groups and the sales force. A business with this capability has an edge because of its enhanced ability to communicate with its customers and—by keeping the solution in-house—by maintaining customer confidentiality. Clean data allows for more true one-to-one marketing, improved response rates, reduced costs due to inaccuracies, and perhaps most important of all, security from fraud.

And more to the point, how do companies utilize customer data effectively, particularly when the data is located in disparate repositories spread across a global business enterprise? Businesses need to recognize and interconnect the components of document management. Five components of document management are create, produce, distribute, receive and update. And an infrastructure is needed to connect these components to reducing end-to-end costs, increase user convenience and ensure delivery reliability and security.

Thus, one of the problems of the prior art is that a system is not available for to provide a closed loop solution for processing return to sender mail and improving data inaccuracies and connect the components of customer relationship management. Therefore, a system and method for processing return to sender mailpieces is needed which integrates return to sender processing with the incoming mailpiece sorting apparatus and with outgoing mailpiece processing using the document inserting system that generate the mailpieces.

SUMMARY OF THE INVENTION

This invention overcomes the disadvantages of the prior art by providing a method of processing return to sender mailpieces and providing updated data to inserting systems producing such mailpieces. This in turn helps to solve data quality problems at their source and reduce processing costs by reducing the number of subsequent return to sender mailpieces. The present invention is directed to, in general, automated mail sorting and automated mailpiece creation and more particularly, a method of reducing return to sender mail using an automated mailpiece sorting apparatus and an inserting system, video coding station and return mail workstation to provide closed loop processing.

An embodiment of the system 200 of the present invention comprises a mailpiece sorting apparatus 8, video coding station 60, inserter system 40, return mail workstation 66 and a web server 80 for interconnecting several components of the system 200. The system 200 provides a closed loop solution for reducing return to sender mailpieces generated by a company that is sorting incoming mailpieces using the automated mailpiece sorting apparatus 8.

In an embodiment of the method of the present invention, mailpieces are sorted by the mailpiece sorting apparatus. Mailpieces that can be read properly by the mailpiece sorting apparatus OCR system are sent to their designated sort bins. Mailpieces that the mailpiece sorting apparatus OCR system determines to be return to sender mailpieces are sent to a return to sender bin. The return to sender mailpieces are processed using a video coding station 60 and a return mail workstation 66. The video coding station 60 is used for input of addressee information read by an operator from an image of the mailpiece. The return mail workstation is used to cleanse the addressee information input at the video coding station 60. Cleansed address information and other messages are sent from the return mail workstation to an electronic data file for an inserter system, which generates outgoing mailpieces. The cleansed and other address information is used to either out sort mailpieces from the outgoing mail stream or correct address information for outgoing mailpieces.

An advantage of the method of the present invention is that it provides a document management solution by providing a system and method to create, produce distribute, receive and update the mailpiece creation and delivery process. Another advantage of the present invention is that it reduces end-to-end costs, increases user convenience and improves delivery reliability and security. Other advantages of the invention will in part be obvious and will in part be apparent from the specification. The aforementioned advantages are illustrative of the advantages of the various embodiments of the present invention.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIGS. 6a–c are a flowchart of an embodiment of the method of the present invention for processing return to sender mailpieces.

DETAILED DESCRIPTION OF THE PRESENT INVENTION

Figure 1:
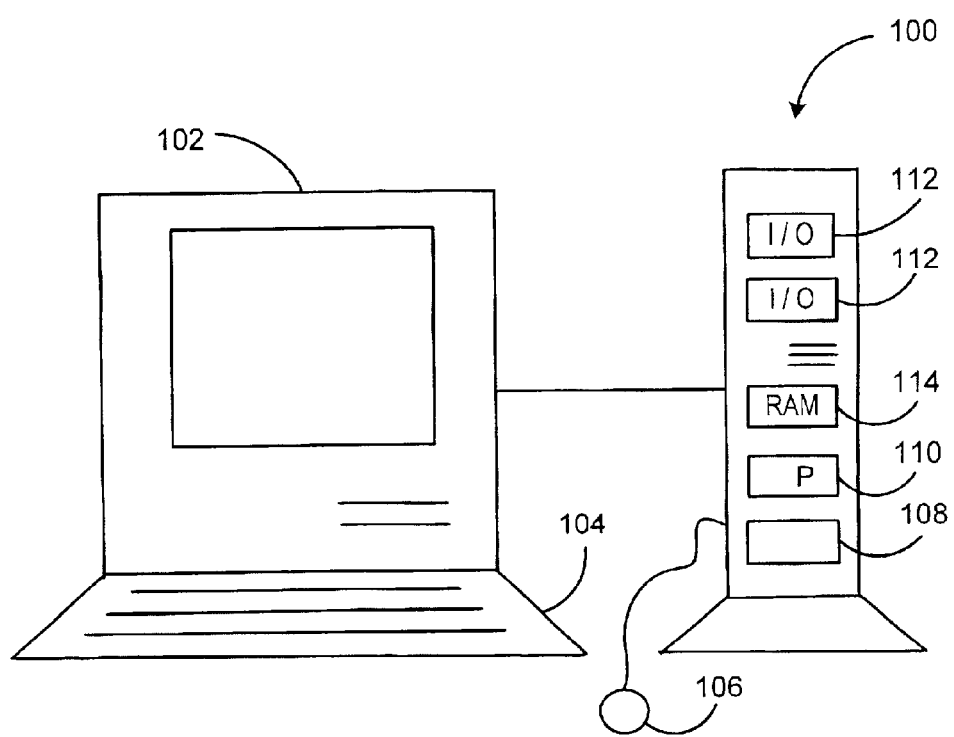
FIG. 1 is a block diagram that illustrates a computer system with which an embodiment of the invention may be implemented.

In describing the present invention, reference will be made herein to FIGS. 1–6 of the drawings in which like numerals refer to like features of the invention. Features of the invention are not necessarily shown to scale in the drawings.

Control and Mail Sorting Apparatus Overview

FIG. 1 is a block diagram that illustrates a computer system 100, the use of which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a track ball 106, and storage media 108. The personal computer 100 may be a workstation that is accessible by more than one user. The personal computer also includes a conventional processor 110, such as a Pentium® microprocessor manufactured by Intel, and conventional memory devices such as hard drive 108, floppy or CDRW drive(s) 112, and memory 114.

Figure 2A:
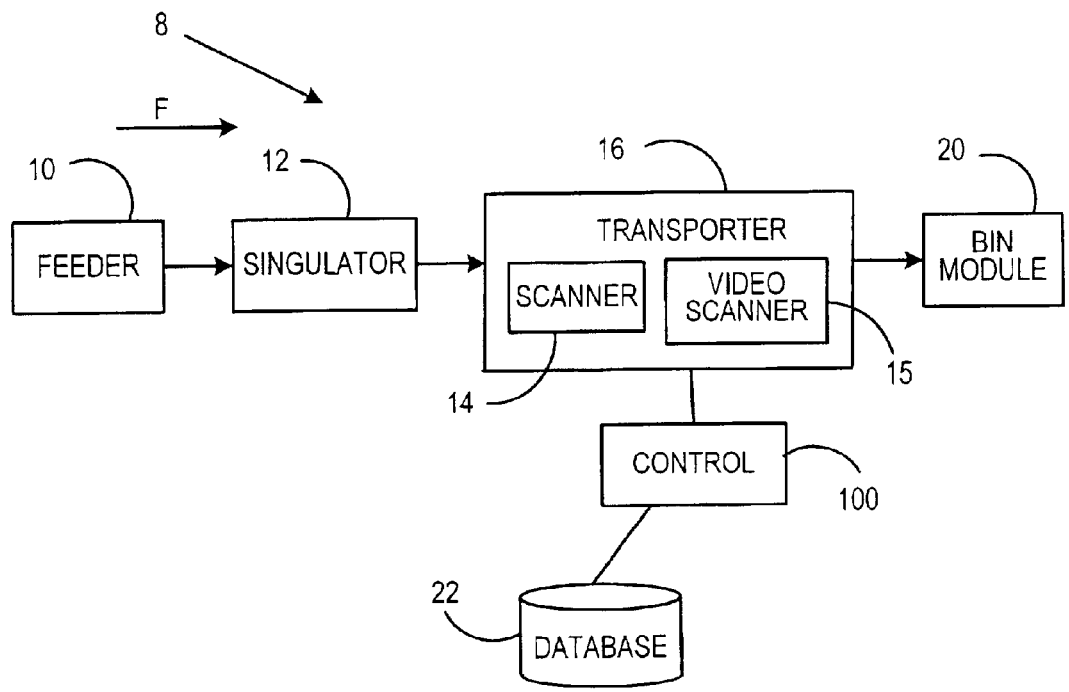
FIG. 2a illustrates the connection of the computer system to a sorting apparatus.
Figure 2B:
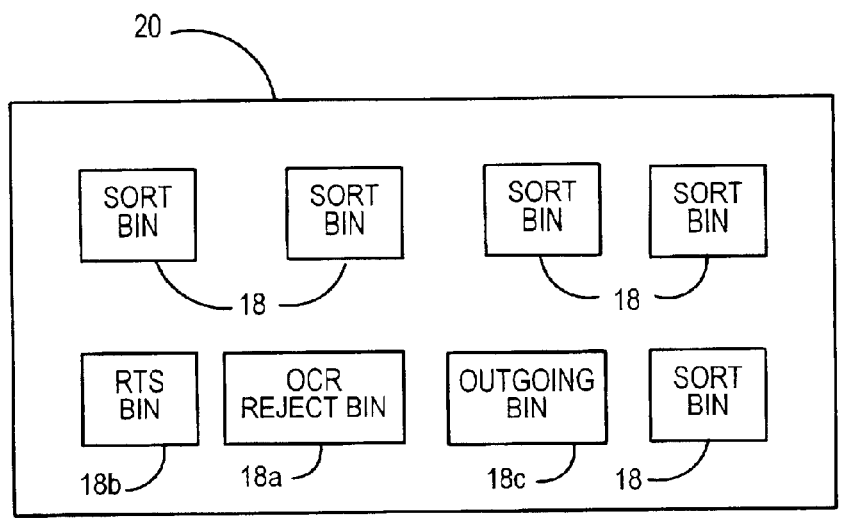
FIG. 2b is a block diagram illustrating an eight bin module which may be part of the mailpiece sorting apparatus which is used to perform an embodiment of the of the present invention.

The computer system 100 can be connected to a sorting apparatus 8 as illustrated in FIG. 2a. The mailpiece sorting apparatus B may generally comprise a feeder 10, a line scan camera 14 (and optical character recognition (OCR) software, not shown), a video scanner 15, a mailpiece transporter 16, a bin module 20 (shown in FIG. 2b) with compartments or bins 18 (sort bin), 18a (OCR reject bin), 18b (RTS bin), 18c (outgoing bin) for receiving sorted mailpieces 30 and a control system 24 which may be the microprocessor based personal computer system 100 described above. The computer system 100 includes appropriate memory devices 108, 114 for storage of information such as an address database 22. One of ordinary skill in the art would be familiar with the general components of the sorting apparatus with which the system and method of the present invention may be implemented.

The mailpiece sorting apparatus 8 and the OCR software may be used to determine the addressee of the mailpiece 30 or other information such as return to sender graphics printed on the face of the mailpiece 30. The reading of various information may be performed with the assistance of intelligent character recognition (ICR) or imaging and optical character recognition (OCR/IC), which may be part of the above mentioned OCR software and can read the various fields on the mailpiece 30.

Document Inserting System and Mail Run Data File (MRDF) Overview

Figure 2C:
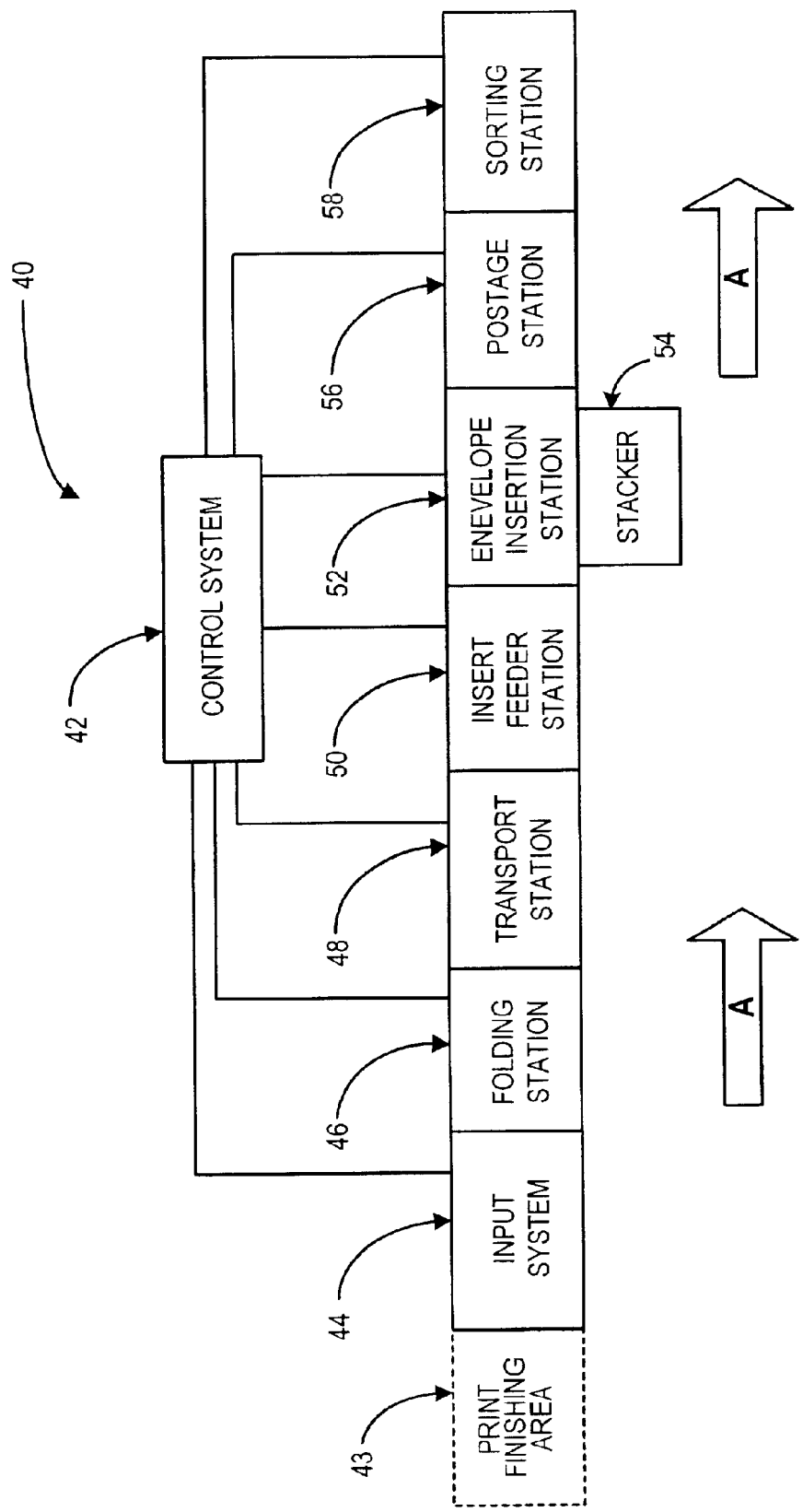
FIG. 2c is a block diagram schematic of a typical document inserting system.
Figure 2D:
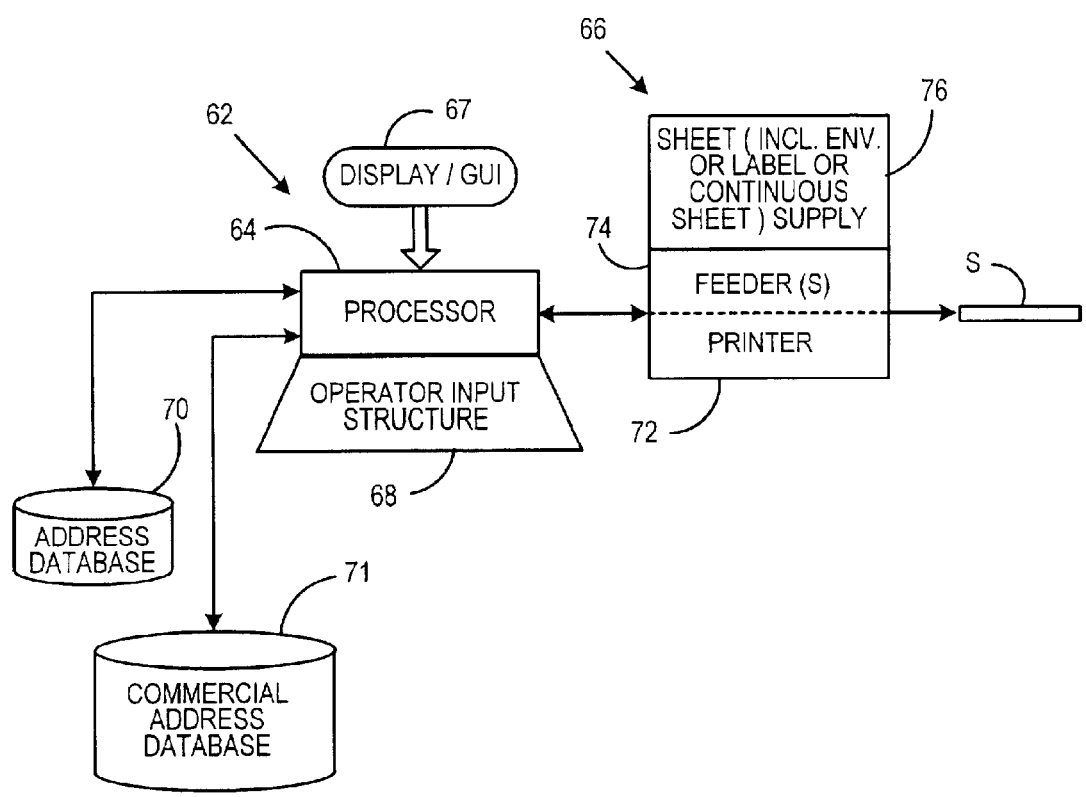
FIG. 2d is a block diagram schematic of a typical return mail workstation.

The mail sorting apparatus 8 of the present invention may be part of an interconnected system 200 that includes a document inserting system 40. The system 200 can help businesses reduce the amount of return to sender mail that is created by mailings generated using the document inserting system 40. FIG. 2c is a schematic of a typical document inserting system, generally designated 40. In the following description, numerous paper handling stations implemented in inserter system 40 are set forth to provide a thorough understanding of the operating environment of the inserter. However it will become apparent to one skilled in the art that the present invention may be practiced without the specific details of these paper-handling stations.

As will be described in greater detail below, system 40 preferably includes an input system 44 that feeds paper sheets (the sheets have previously been printed upon and are ready for insertion into an envelope) from a paper web or individual sheets (not shown) to an accumulating station that accumulates the sheets of paper in collation packets (not shown). In this particular example, only a single sheet of a collation is coded (the control document), which coded information enables the control system 42 of inserter system 40 to control the processing of documents in the various stations of the mass mailing inserter system. The code (not shown) can comprise a bar code, UPC code or the like. In the case of a mailpiece with an undeliverable addressee, the code can contain such undeliverable addressee information (e.g. an undeliverable tag for outsorting prior to the postage station 56). The code provides address information to the inserter system so that an envelope can be addressed correspondingly to the insert. Alternate methods of inserting include printing the address on the insert document only and inserting such document into a window envelope which reveals the address, printing the documents in a print finishing 43 (shown with a dashed line in FIGS. 3 and 5) area upstream from the input system 44 of document inserting system 40 and feeding the documents directly to the input system 40 from the print finishing area 43. Returning to the preferred embodiment where a bar code is printed on each insert or sheets, essentially, input system 44 feeds sheets in a paper path, as indicated by arrow A along a deck is commonly called the main deck (not shown) of inserter system 40. After sheets are accumulated into collations by input system 44, the collations are folded in folding station 46 and the folded collations are then conveyed to a transport station 48, preferably operative to perform buffering operations for maintaining a proper timing scheme for the processing of documents in inserting system 40.

Each sheet collation is fed from transport station 48 to insert feeder station 50. It is to be appreciated that a typical inserter system 40 includes a plurality of feeder stations, but for clarity of illustration only a single insert feeder 50 is shown. Insert feeder station 50 is operational to convey an insert (e.g., an advertisement) from a supply tray to the main deck of inserter system 40 so as to be nested with the aforesaid sheet collation being conveyed along the main deck. The sheet collation, along with the nested insert(s) are next conveyed into an envelope insertion station 52 that is operative to insert the collation into an envelope. The system is configured with a stacking mechanism 54 for the present invention so that mailpieces for which the ID code contains information indicating that the addressee is undeliverable can be diverted to the stacking mechanism such as, for example, a vertical stacker that is connected to the document inserting system 40 prior to the postage station 56. Alternately, the stacker could be a gravity stacker or in-line stacker or other stacker as determined by one of ordinary skill in the art who may consider factors such as, for example, available physical space, including machine profile and footprint.

In the case where the addressee is not an undeliverable addressee, the envelope is conveyed to the postage station 56 where appropriate postage is applied thereto. Finally, the envelope is conveyed to sorting station 58 that sorts the envelopes in accordance with postal discount requirements.

The use of the document inserting system 40, such as, for example, a Series 9 Inserter Systems manufactured by Pitney Bowes Inc. of Stamford, Conn., is well known. Such document inserting systems are used by organizations (e.g., banking institutions, utility companies, insurance companies, credit companies, and the like) for assembling large amounts of outgoing mailpieces for dispatch through the postal system. Typically, such organizations create documents, such as billing documents, in a computer such as a mainframe computer system (not shown) that is separate from the document inserting system 40 that will process the documents into such mailpieces. Each batch of documents is generally referred to as a mail run. Generally, document inserting systems have processed mail runs based on control codes printed on the documents being processed.

More recently, document inserting system technology has evolved to include the processing of a mail run based on an electronic data file, referred to herein as a mail run data file or MRDF 59 (shown in FIG. 5) that is generated off line from the document inserting system 40, for example, by a main frame computer (not shown) which created the mail run documents. The MRDF is a file containing individual mailpiece records for all the mailpieces in a mail run. The use of the MRDF with a document inserting systems 40 would be familiar to one of ordinary skill in the art.

Return Mail Workstation

The interconnected system 200 of the present invention (shown in FIG. 5) can include a return mail workstation 66, such as a docSense Return Mail Workstation™ Manufactured by Pitney Bowes Inc. of Stamford, Conn. The return mail workstation 66 performs address cleansing of addressee information (correction and verification or indication of incorrect/uncorrectable address). Address cleansing can be done for returned mailpieces 30a and in the case of the present invention the addressee information in the MRDF (described above) or print documents for print finish area 43 of the document inserting system 40. The return mail workstation 66 uses a matching program and a database to verify and correct addressee data input by an operator. The database 71 used by the return mail workstation can be a large, commercially available accurate consumer database located remotely from the workstation 66 as indicated by dashed lines in FIG. 2d. One such database features more than 10 billion records furnished by more than 60,000 suppliers of information and cover a staggering 95 percent of U.S. households. This database functions independently of the NCOA and Postal databases and offers accurate and current data. A typical return mail workstation 66 is illustrated in detail in FIG. 2d. The return mail workstation 66 generally includes suitable computer 62, (i.e. a personal computer) with a microprocessor 64 such as a Pentium® microprocessor manufactured by Intel and monitor 67 (which can display a graphical user interface (GUI) to provide an operator with a helpful interface to request functions such as query an address, create a new mailing label, update the customer database, and/or regenerate a mail piece for mailing), operator input device 68 for permitting an operator to communicate requests or commands to the microprocessor 64, and thus to the computer 62, includes but is not limited to any keyboard, audio or other data input device to which the microprocessor 64 is programmed to be responsive. In addition, the personal computer 62 preferably includes one or more conventional data storage devices for storage of addressee data 70 such as data that has been received from the commercially available database 71.

Further, the return mail workstation 66 includes printing device 74, which may be any type of commercially available printer, connected in serial or parallel communication with the microprocessor 64, and thus to the computer 62, for control thereby. Preferably, the return mail workstation 66 also includes feeder 74 for feeding a sheet S, such as cut sheet, envelope, label or a continuous form, or the like, through the printing device 74. Still further, the return mail workstation 66 includes any conventional source 76 of supply of sheets S for use by the printing device 74. The processor 64, and thus the computer 62, includes the programs and routines hereinafter discussed for causing the computer 62 to implement the processing steps according to the invention.

The return mail workstation 66 can perform identification and correction of addressee information such as, for example, names, personal titles, address information and customer move data, and verify life status. The return mail workstation 66 could also verify and append a typical names including nicknames, hyphenated last names and personal name suffixes such as DDS, MD and Jr. Additional functionality can also include validation and correction of conventional street addresses including Post Office boxes and rural routes, and transposed street addresses.

The return mail workstation 66 can be used as a standalone local access configuration or workstation for an individual user, or it can be set up for multiple users to receive customer information via a LAN-based mainframe or channel attachment. The return mail workstation can also be used Web-based (http) server or direct TCP/IP connectivity.

The returned mail workstation 66 as implemented in the system 200 of the present invention helps to reduce returned mail volume, lower returned mail expenses and rework costs. It also helps to maximize mail deliverability, reduce costs associated with paper, envelopes, printing, postage and labor. It can also help to increase efficiency and productivity in mailing operations. The return mail workstation 66 as implemented in the present invention can help a company reduce the amount of potential return to sender mailpieces that are created in future mailpiece preparation by providing corrected address information for future mailings.

Reject Mailpieces

Figure 3A:
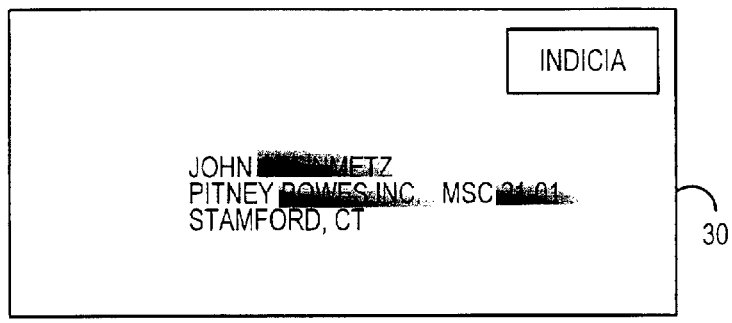
FIGS. 3a–3d illustrate various reject mailpieces.
Figure 3B:
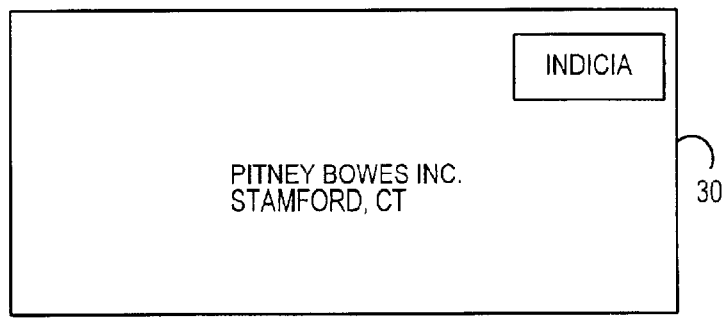

FIGS. 3*a*–3*d* illustrate various reject mailpieces 30. FIG. 3*a* is an example of a reject mailpiece 30, which is unreadable by the OCR system of the mailpiece sorting apparatus 8 because the addressee information is smeared (OCR reject). In some instances, the addressee information can be smeared to the point where the operator would need to open the mailpiece 30 to determine the addressee. FIG. 3*b* is an example of a reject mailpiece 30 for which the intended individual addressee cannot be determined from the face of the mailpiece 30 because there is no individual addressee but rather a general address to the company, as in this example, Pitney Bowes Inc. (mystery mail). In the case of the mystery mail of FIG. 3*b*, the mailpiece 30 would need to be opened to determine the appropriate addressee. In another example, not shown, the mailpiece 30 could be addressed to a company and/or department and would need to be opened to determine the appropriate addressee.

Figure 3C:
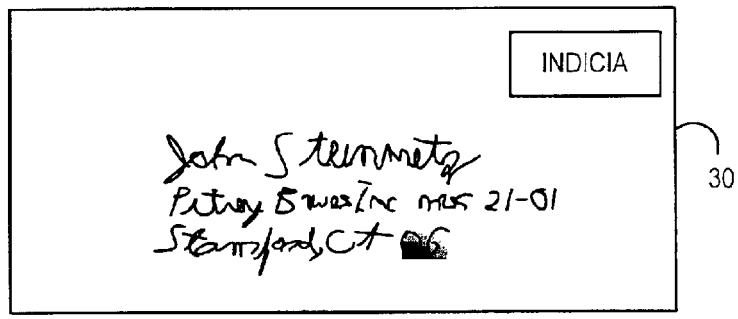

FIG. 3*c* is an example of mystery mail for which the intended individual addressee cannot be determined using OCR because the handwriting in the addressee segment is unreadable by the OCR of the mailpiece sorting apparatus 8 (mystery mail). It should be noted that while some handwriting is readable by OCR systems, not all handwriting is automatically readable, especially handwriting where the character shapes are of poor quality and are poorly spaced such as, for example, some cursive writing as is illustrated on mailpiece 30 in FIG. 3*c*.

Figure 3D:
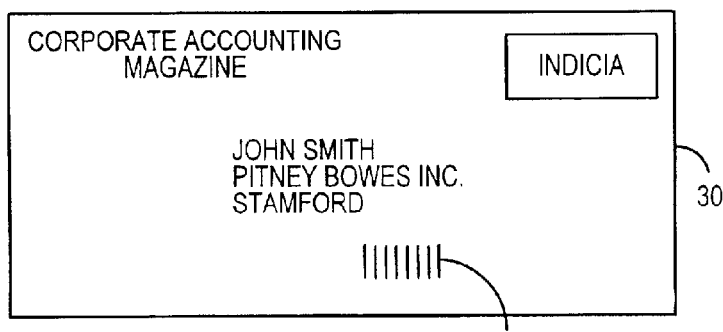

FIG. 3*d* is an example of a reject mailpiece 30 for which the operator can determine the appropriate addressee from the face of the mailpiece 30 (without opening the mailpiece 30) but for which the OCR system of the mailpiece sorting apparatus 8 could not determine the appropriate addressee (research mail). In the example of FIG. 3*d*, the addressee database 22 contains two addressees named John Smith. The operator may be able to determine the appropriate addressee by reading the return address information. For example John Smith in accounting might get a mailpiece with a return address of a corporate accounting magazine, whereas John Smith of legal might get a mailpiece with a return address of a corporate counsel society. Thus, the mailpiece of FIG. 3*d* would-be routed to John Smith of accounting and such information would be input by the operator using the voice recognition system.

Return to Sender (RTS) Mailpieces

Some reject mailpieces may be return to sender (RTS) mailpieces. A mailpiece may be returned to the sender for a number of reasons, such as, 1) the addressee or intended recipient printed on the mailpiece 30 may not be accurate or complete enough for the post office (i.e. United States Postal Service (USPS)) to determine the intended destination; 2) the addressee or intended recipient may have moved and left no forwarding address; or 3) the addressee or intended recipient may have moved, left a forwarding address, but the time limit for the post office to forward their mailpieces may have expired.

The post office may mark the return to sender mailpiece as follows: 1) an image of a hand with a pointing finger and Return to Sender inscribed within or near the hand; 2) text may show the post office returning the piece and the reason why it was returned; 3) the post office may put on a label with return to sender text and additional text indicating why the piece was not deliverable; and/or 4) the post office may draw a line through the recipient address and/or its POSTNET bar code. These RTS markings or labels may obscure part or all of the original addressee or intended recipient.

Figure 4A:
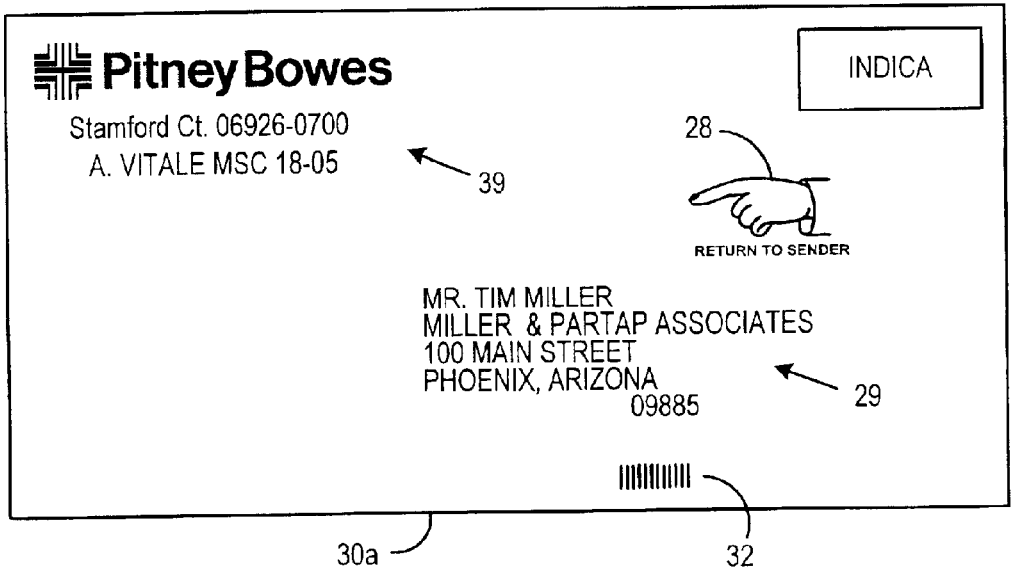
FIGS. 4a–b illustrates exemplary return to sender mailpieces.

FIG. 4*a* illustrates an exemplary return to sender mailpiece 30*a*. The mailpiece 30 includes an image 28 of a hand with a pointing finger and return to sender inscribed near the hand. The exemplary mailpiece of FIG. 4 shows the addressee or intended recipient 29: Mr. Tim Miller, Miller & Partap Associates, 100 Main Street, Phoenix, Ariz. 09885. In this example, the addressee or intended recipient has not been obscured by the USPS markings on the envelope. The return address or sender for the exemplary mailpiece is: Pitney Bowes, A. Vitale, MSC 18-05, Stamford, Conn. 06926-0700.

Figure 4B:
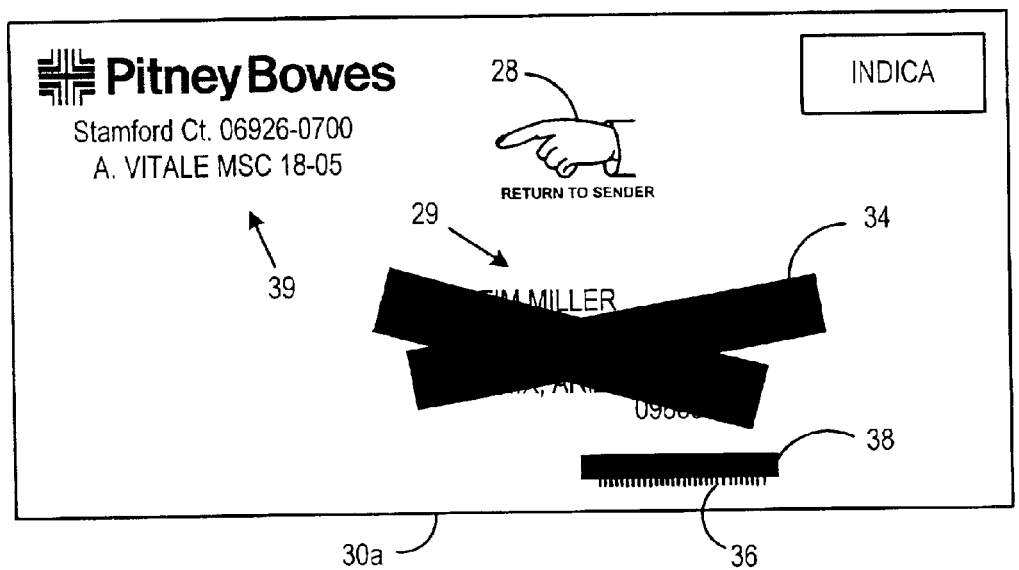

FIG. 4*b* illustrates an exemplary return to sender mailpiece 30*a* where the addressee information has been obscured. The mailpiece 30 includes an image 28 of a hand with a pointing finger and return to sender inscribed within the hand. The exemplary mailpiece of FIG. 4b shows the addressee or intended recipient 29: Mr. Tim Miller. In this example the addressee 29 (including ZIP Code and state have has been obscured by the USPS markings 34 on the envelope. The POSTNET barcode 36 has also been obscured by markings 38. The return address or sender 39 for the exemplary mailpiece is: Pitney Bowes, A. Vitale, MSC 18-05, Stamford, Conn. 06926-0700. The present invention sorts return to sender mailpieces such as the envelope of FIG. 4b to the return to sender bin 18b (see FIG. 2b) using recognition by the OCR system of return to sender indicators or other methods as determined by one of ordinary skill in the art considering, for example, factors such as cost and accuracy.

System for Processing Return to Sender Mailpieces

Figure 5:
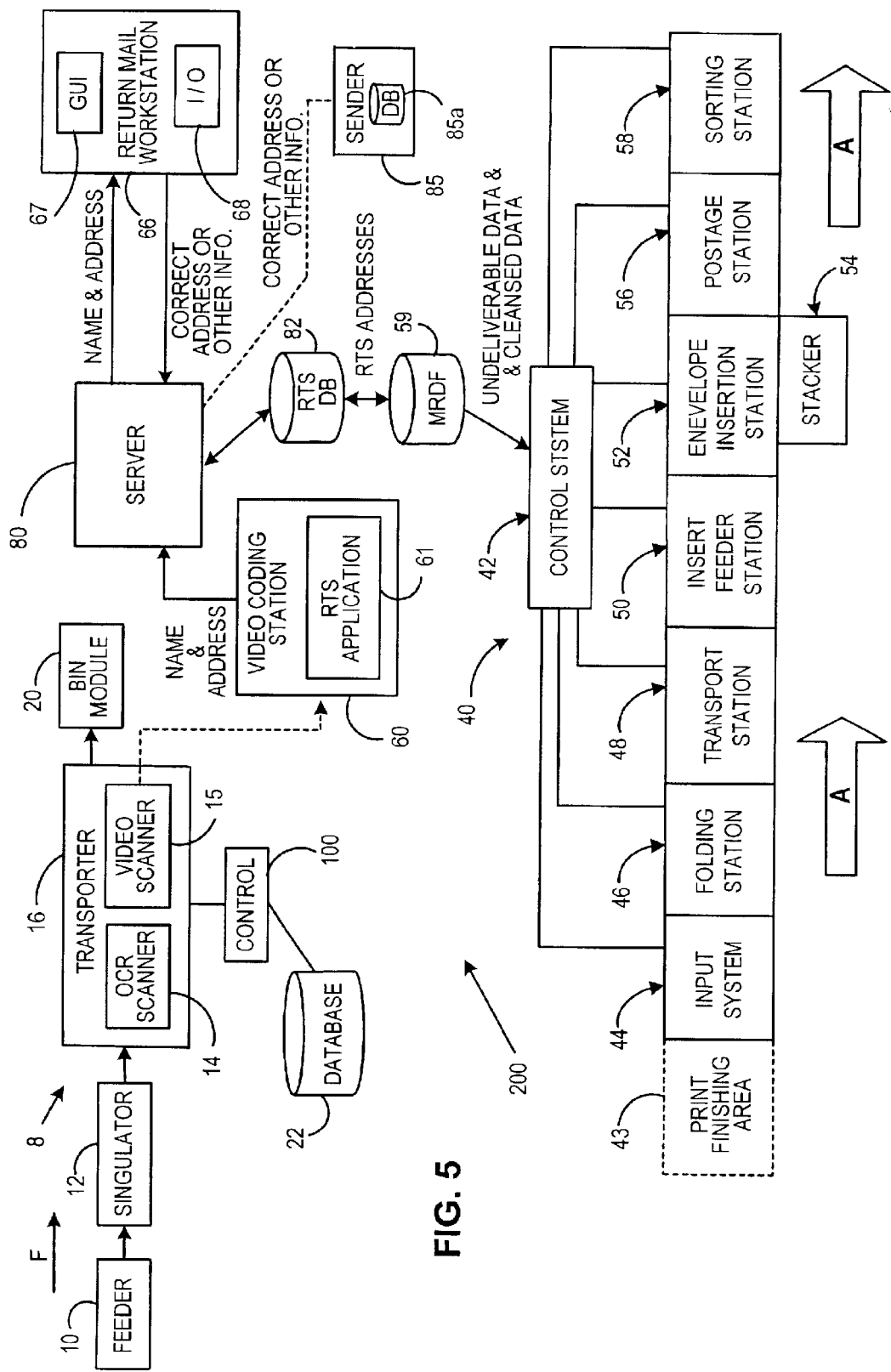
FIG. 5 is a block diagram schematic of an embodiment of the apparatus present invention.

An embodiment of the system of the present invention is illustrated in FIG. 5 and referred to generally as system 200 which comprises mailpiece sorting apparatus 8, video coding station 60, inserter system 40, return mail workstation 66 and a web server 80 for interconnecting several components of the system 200. The system 200 provides a closed loop solution for reducing return to sender mailpieces generated (using a document inserting system 40) by a company that is sorting incoming mailpieces (using an incoming mail sorting apparatus 8) based upon information collected using the automated incoming mail sorting apparatus 8.

The interconnection and functionality of the system 200 can be understood generally as follows. The mail sorting apparatus 8 as described above, includes a video scanner 15. A video image of a mailpiece can be captured using the video scanner and transmitted to a video coding station 60 which includes a return to sender (RTS) application 61. The video coding station 60 could be located remotely from the mail sorting apparatus 8 as is indicated by the dashed line connection in FIG. 5. Generally, video processing of mailpieces can be performed at on-site video coding terminals or offsite video coding facilities where the video image is transmitted for determination of addressee by an operator.

In the present embodiment, the operator inputs the addressee information read from the video image of the mailpiece. It should be noted that in this example, the operator is inputting the address as read and not making corrections to such addresses although alternately the operator could make corrections when inputting address information. The operator can indicate that the mailpiece is a return to sender mailpiece and request that the system 200 send the addressee information for such mailpiece to the return to sender workstation 66. The transmission of such information can be facilitated using a web server 80. Transmission by other means could be determined by one of ordinary skill in the art. The web server 80 is connected to the return mail workstation 66 where the addressee information is obtained and if possible cleansed (also called address hygiene), meaning that the addressee information is corrected by comparing it to a database such as the commercially available database 71. The correction process typically is performed using a comparison software package and a comprehensive address database. The return mail workstation 66 can provide results such as, for example, a corrected address or a message that a corrected address is not available. The correct address can be saved in database 70.

The return mail workstation 66 can send the resulting information indicating for example that a correct address is not available (and thus the mailpiece is undeliverable) or can provide the corrected or cleansed address to a return to sender database 82 through server 80 which interconnects the return mail workstation 66 with the RTS database 82. The RTS database 82 stores the address information and is interconnected with the MRDF 59 (described above) of the inserter system. The addresses in the RTS database 82 can be compared to the address information in the mailpiece records of the MRDF 59 and the MFDF 59 can provide the document inserting system 40 the correct address for a mailpiece or tag the mailpiece as undeliverable and outsort it to vertical stacker 54 prior to providing postage at postage station 56. In this embodiment, the reason for outsorting the mailpieces, as opposed to omitting the printing of an undeliverable address on a mailpiece, is because the documents corresponding to the address have already been created in a separate print finishing area prior to being provided to the document inserting system 40. Note that it would be cumbersome to manually remove such documents from the stack or group of printed documents. In such embodiment the documents could be inserted into a window envelope. Alternately, the documents could be inserted into correspondent addressee preprinted envelopes or the documents could be inserted into an envelope and the addressee printed onto the envelope at a print station (not shown) of the document inserting system 40.

In an alternate embodiment, undeliverable address information can be provided to a print finish area and the documents corresponding to such addresses can be omitted from finishing. In such embodiment, interconnection of system 200 with the print finishing area 43 (shown with dashed lines in FIG. 5) would be needed. The print finish area could be coupled to the document inserting system 40 so long as it could print at speeds compatible with the document inserting system 40. Alternately, the print finishing area 43 could be located separately from the document inserting system 40, for example, in a print finishing room (not shown) equipped with a computer system and associated printing devices. After documents are printed in the print finishing room, they can be manually delivered to the document inserting system 40 for further processing.

Method for Processing Return to Sender Mailpieces

Figure 6A:
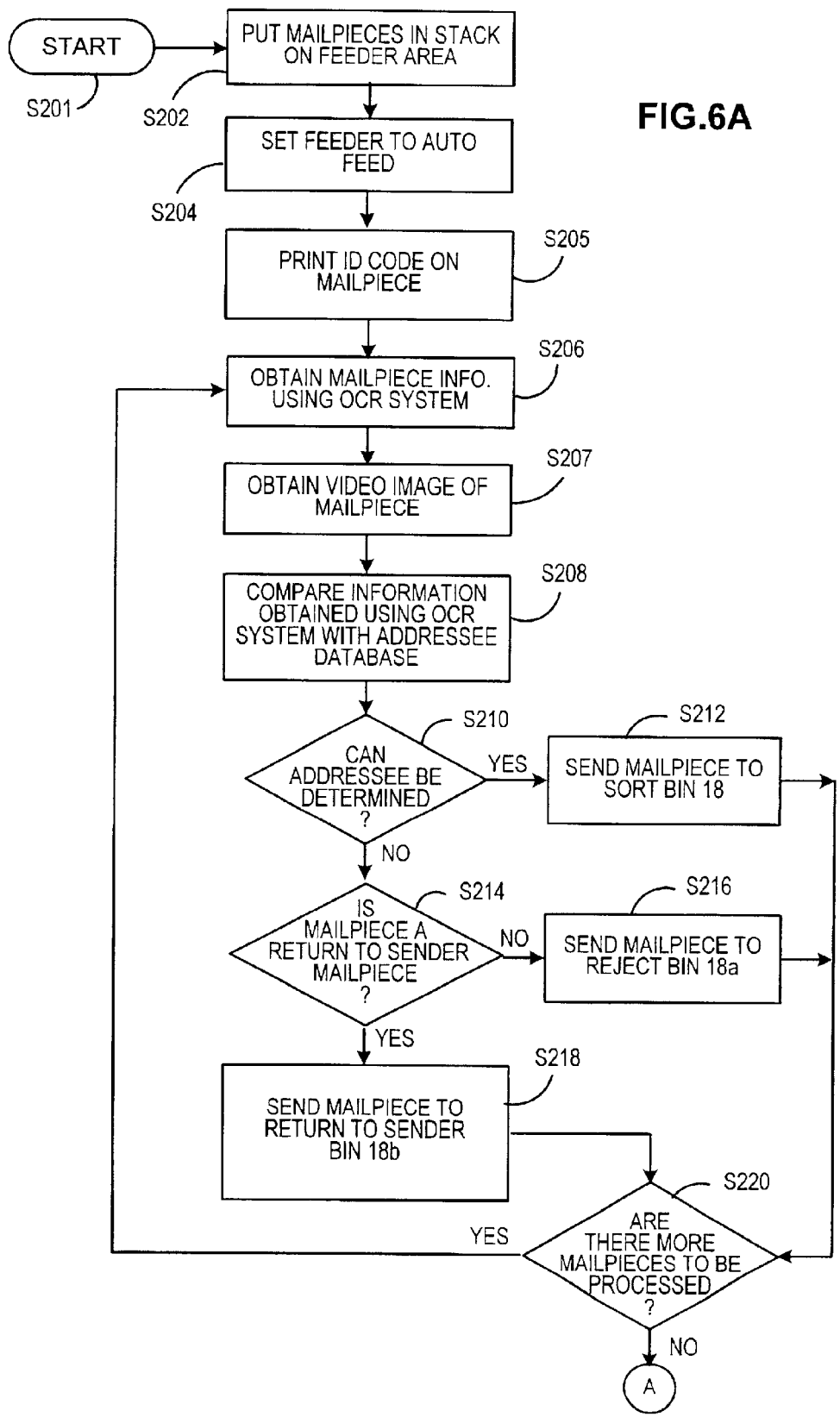

FIGS. 6a–b illustrates an embodiment of the method of the present invention for processing return to sender mailpiece(s). An embodiment of a method of the present invention may be performed using the system 200 illustrated in FIG. 5. Turning to FIG. 6a, at step S201 the method begins. At step S202 a stack of incoming mailpieces (not shown) is placed on the feeder 10 of the mailpiece sorting apparatus 8. At step S204 the feeder 10 is set to auto feed and mailpiece begin to be fed along feed path F of the mailpiece sorting apparatus 8. At step S205 an identification (ID) code 32 (shown in FIG. 4a) is printed on the mailpiece. At step S206 the mailpieces 30 are read using the OCR system. At step S207 a video image of the mailpiece 30 is obtained. At step S208 information obtained using the OCR system is compared with the addressee database 22. At step S210 a query is made as to whether the addressee can be determined from the information read by the OCR system. If the answer to the query S208 is yes, then the mailpiece 30 is delivered to the appropriate sort bin 18 at step S212. If the answer to the query of step S210 is no, then at step 214 a query is made as to whether the mailpiece is a return to sender mailpiece.

The determination as to whether a mailpiece is a return to sender mailpiece may be made using various methods as determined by one of ordinary skill in the art considering, for example, cost factors. Typical return to sender mailpieces are marked with return to sender text and I or a graphics symbol or the addressee information is obscured. An OCR system would need the capability to read particular regions of the mailpiece (read regions) to recognize return to sender icon or markings. Other methods can be determined by one of ordinary skill in the art to determine whether a mailpiece is a return to sender mailpiece.

Returning to the query of step S214, if the answer to the query S214 is no, then the mailpiece 30 is delivered to a reject bin 18a at step S216. If the answer to the query S214 is yes, then the mailpiece 30 is delivered to the return to sender sort bin 18b at step S218. Next, a query is made at step S220 as to whether there are additional mailpieces 30 to be processed. If the answer to the query of step S220 is yes, then steps S206 through S218 are performed until no mailpieces 30 are left to be processed. The query of step S220 is also made after steps S212 and S216. If the answer to the query of step S220 is no, then the method proceeds to step S222.

Figure 6C:
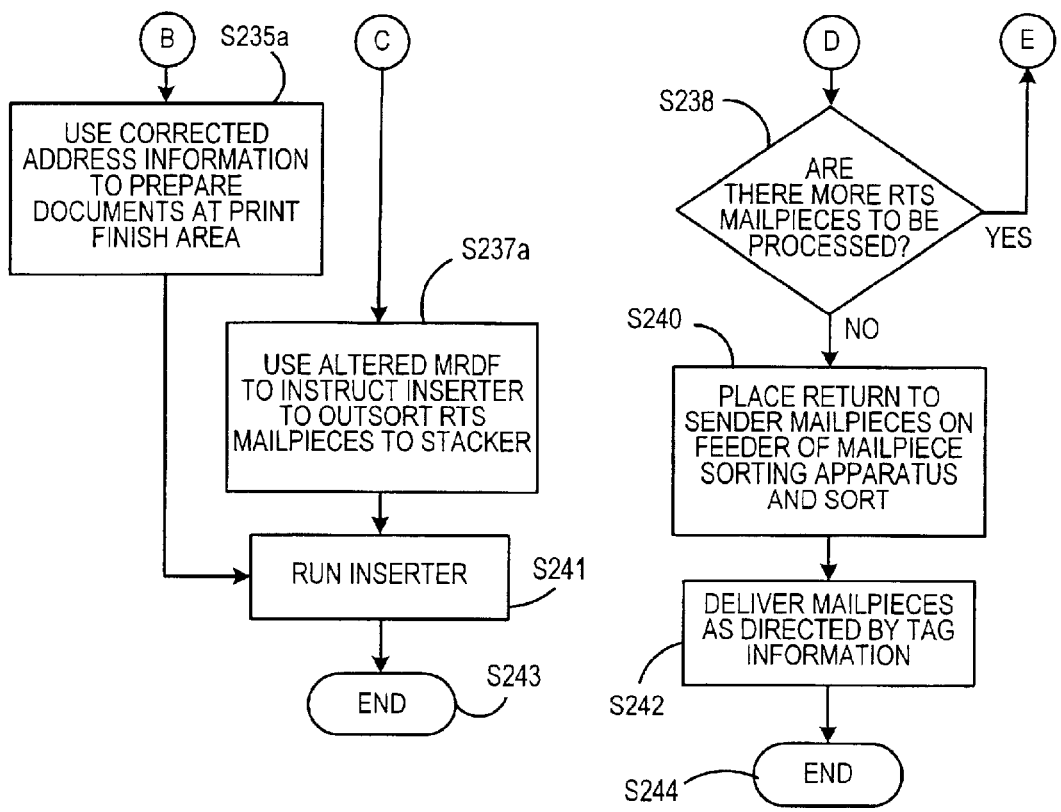

Turning to FIGS. 6b and 6c, the method continues at step S222 where a video image of the mailpiece is sent to the video coding station 60. At step S223 addressee information is sent to return mail workstation 66. Next, at step S224 a query is made as to whether the addressee can be corrected or cleansed using the address cleansing database of the return mail workstation 66. If the answer to the query of step S224 is no, then at step S226 the mailpiece ID code 32 for the return to sender mailpiece 30a is tagged to indicate that the addressee is undeliverable. Next at step S228, the undeliverable addressee information is saved in RTS database 82. Returning to the query of step S224, if the answer to the query is yes, then at step S230 the mailpiece ID code 32 for the return to sender mailpiece 30a is tagged to indicate addressee information and code for delivery to an appropriate outgoing mailpiece bin 18c. In this embodiment after removal of the return to sender mailpiece 30a from the outgoing bin 18c, the mailpiece 30a can be labeled with the cleansed address, which is printed using a label printer (not shown). The label printer can be located in the area of the physical location of the mailpiece.

Steps S228 and S230 are followed by step S232 where a query is made as to whether the sender of the return to sender mailpiece 30a can be determined. If the answer to the query of step S232 is no, then at step S234 the mailpiece ID code 32 for the return to sender mailpiece 30a is tagged to indicate that the mailpiece should be delivered to the reject bin 18a on the next sort. If the answer to the query of step S232 is yes, then at step 236, the correct address or notification of an incorrect address, as the case may be, is sent to the sender 85 of the mailpiece (i.e. via email) and I or to the sender's database 85a for action such as correction, notation or deletion of the address record. This is done to prevent future mailings to the same addressee and thus reduce future return to sender mailpiece 30a generated by the sender using the document inserting system 40 or other document preparation or address printing system.

Steps S234 and S236 flow to step S238 where a query is made as to whether there are more return to sender mailpieces to be processed. If the answer to the query of step S238 is yes, then steps S222 through S236 are performed until no additional return to sender mailpieces need processing. If the answer to the query of step S238 is no, then at step S240 the return the return to sender mailpieces 30a are placed on the mailpiece sorting apparatus and resorted to appropriate bins by reading the ID code 32 and using the information tagged to the ID code to determine the appropriate bin. At step S242, if the mailpiece is tagged as undeliverable then it is sorted to reject bin 18b or if the mailpiece is tagged with cleansed address information then it is sorted to outgoing bin 18c. At step 244, this branch of the method ends.

In an alternate embodiment, indicated with dotted lines connecting step S237 to the flow chart of FIG. 6b, after the query of step S232, if the answer is yes (sender can be determined) then corrected address information or other information is sent to the sender's mail run data file (MRDF) so that future mailings produced using document inserting system 40 can divert the mailpieces with undeliverable addresses from the outgoing mail stream as indicated by step S237a. Next at step S241 the document inserting system 40 is run to create an outgoing mailing that, in accordance with the present invention, will have reduced the number or return to sender mailpieces generated as compared to similar mailing creations using the mail run data file or mailing database prior to updating of step S237. At step S243, this branch of the method ends.

In an alternate embodiment, indicated with dotted lines connecting step S235 to the flow chart of FIG. 6b, after the query of step S232, if the answer is yes (sender can be determined) then corrected address information or other information is sent to the sender's print finish area 43 and document(s) to be inserted can either be omitted from the print finish run or address(es) can be corrected at step S235a. Next at step S241 the inserter system is run to create an outgoing mailing that, in accordance with the present invention, will have reduced the number or return to sender mailpieces generated as compared to similar mailing creations using the mail run data file or mailing database prior to updating of step S235. At step S243, this branch of the method ends.

The steps of notifying the sender of the mailpiece that such mailpiece was undeliverable and/or updating the senders MRDF 59 can save the future cost of processing return to sender mail that would have been returned had the addressee databases not been updated or had the MRDF 59 not indicated to the inserter to outsort mailpieces prior to completing the step of applying postage to the mailpiece and delivering the mailpiece to the outgoing mailstream. It has been estimated that 3% to 7% of incoming mail that a company sends out with an incorrect address is returned to sender. The cost of processing an individual return to sender mailpiece in an incoming mailstream is estimated to be approximately $3 to $8. Companies handling very large numbers of incoming mailpieces can save thousands of dollars per year by implementing the method and apparatus of the present invention. Because of the significant expense in processing such mailpieces, in another embodiment the incoming mailpiece sorting apparatus could track and calculate statistical information regarding the return to sender mailpieces. The sender could be charged for the cost of sorting return to sender mailpieces.

The embodiments described herein can provide the advantages lowering the costs of processing return to sender mailpieces by creating a system with the capability of conveying information regarding return to sender mailpieces so that such information can be used in incoming mailpiece processing and future outgoing mailpiece processing such as in the generation of future mailings. While the present invention has been disclosed and described with reference to a various embodiments thereof, it will be apparent, as noted above that variations and modifications may be made therein. It is, thus, intended in the following claims to cover each variation and modification that falls within the true spirit and scope of the present invention.

What is claimed is:

1. A system for sorting incoming mailpieces and preparing outgoing mailpieces, the system comprising:

a mailpiece sorting apparatus for sorting incoming mailpieces and obtaining a video image of the mailpieces;

a video coding station linked to the mailpiece sorting apparatus for viewing the video image of the mailpieces obtained by the mailpiece sorting apparatus and identifying return-to-sender mailpieces, the video coding station configured for an operator to input address information for the return-to-sender mailpieces for use by the system;

a return mail workstation linked to the video coding station for providing update information for the return-to-sender mailpieces to the system regarding the input address information input by the operator;

an inserting apparatus for preparing outgoing mailpieces, the inserting apparatus linked to the return mail workstation; and a data file for use with the inserting apparatus, the data file containing address information for preparing outgoing mailpieces;

whereby the update information provided by the return mail workstation is used to update the data file for use with the inserting apparatus, thus reducing the amount of return to sender mailpieces created by the inserting apparatus.

2. An method for sorting incoming mailpieces and preparing outgoing mailpieces, the method comprising:

a. sorting incoming mailpieces and obtaining a video image of the mailpeces using a mailpiece sorting apparatus;

b. viewing me video image of the mailpieces obtained by the mailpiece sorting apparatus at video ceding station, the video coding station configured to identify return-to-sender mailpieces and for an operator to input address information;

c. inputting address information by the operator regarding the return-to-sender mailpieces;

d. providing update information regarding the return-to-sender mailpieces using a return mail workstation, the update information regarding the input address information input by the operator;

e. storing the update information in a return mail workstation database:

f. updating a data file with update information from the return mail workstation database, the data file for use with an inserting apparatus and containing address information for preparing outgoing mailpieces; and g. preparing outgoing mailpieces using the inserting apparatus;

whereby the method reduces the amount of return to sender mailpieces created by the inserting apparatus.

3. The method as claimed in claim 2 further comprising the step of:

h. sending update information to the sender for updating the sender's addressee information.

4. A method for sorting incoming mailpieces and preparing outgoing mailpieces, the method comprising:

a. sorting incoming mailpieces and obtaining a video image of the mailpieces using a mailpiece sorting apparatus;

b. viewing the video image of the mailpieces obtained by the mailpiece sorting apparatus at video coding station, the video coding station configured for an operator to input address information e. inputting address information by the operator, d. providing update information using a return mail workstation, the update information regarding the input address information input by the operator;

e. updating a data file with update information from the return mail workstation database, the data file for use with an inserting apparatus and containing address information for preparing outgoing mailpieces;

g. preparing outgoing mailpieces using the inserting apparatus; and h. sending update information to the sender for updating the senders address information, whereby the method reduces the amount of return to sender mailpieces created by the inserting apparatus.

* * * * *